United States Patent
Leger et al.

(10) Patent No.: US 11,236,851 B1
(45) Date of Patent: Feb. 1, 2022

(54) QUICK CONNECT PIPE FITTING SYSTEMS AND METHODS

(71) Applicant: Trinity Bay Equipment Holdings, LLC, Houston, TX (US)

(72) Inventors: John Paul Leger, Baytown, TX (US); Dale Brian Marietta, Katy, TX (US); Alexander Lee Winn, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/223,135

(22) Filed: Apr. 6, 2021

(51) Int. Cl.
*F16L 37/086* (2006.01)

(52) U.S. Cl.
CPC .................. *F16L 37/086* (2013.01)

(58) Field of Classification Search
CPC ...... F16L 37/22; F16L 37/086; F16L 19/0231
USPC ........................................................ 285/317
See application file for complete search history.

(56) References Cited

U.S. PATENT DOCUMENTS

| | | | | |
|---|---|---|---|---|
| 592,899 A | * | 11/1897 | Wilson | F16L 37/086 285/317 |
| 648,232 A | | 4/1900 | Brandt | |
| 2,208,353 A | | 7/1940 | Woolley et al. | |
| 2,431,268 A | * | 11/1947 | McIntyre | F16L 37/086 285/317 |
| 2,476,172 A | * | 7/1949 | Williams | F16L 37/086 285/317 |
| 3,503,637 A | * | 3/1970 | Maeshiba | F16L 37/086 285/317 |
| 3,507,520 A | | 4/1970 | Guldener et al. | |
| 4,056,272 A | | 11/1977 | Morrill | |
| 4,138,148 A | * | 2/1979 | Zaremba | 285/317 |
| 4,801,160 A | | 1/1989 | Barrington | |
| 4,919,456 A | | 4/1990 | Wong | |
| 5,251,941 A | | 10/1993 | McGarvey | |

(Continued)

FOREIGN PATENT DOCUMENTS

| | | |
|---|---|---|
| CN | 101737583 A | 6/2010 |
| CN | 204127536 U | 1/2015 |

(Continued)

OTHER PUBLICATIONS https://cdn2.hubspot.net/hubfs/6000523/FOGT_August2019%20Theme/Pdf/Techlok_Product_Range-A4-V003-2014.pdf; May 22, 2019.

*Primary Examiner* — Zachary T Dragicevich
(74) *Attorney, Agent, or Firm* — Conrad J. Hsu

(57) ABSTRACT

Techniques for implementing a pipeline system that includes a first pipeline component to be fluidly connected to a pipe segment, which includes tubing that defines a pipe bore and a fluid conduit within an annulus of the tubing, and a second pipeline component that includes a female fitting connector that defines a connector cavity. The first pipeline component includes a male fitting connector that defines a first connector bore and an outer surface of a leading end of the male fitting connector includes a retainer tab or base threading. The female fitting connector includes a base portion that defines a second connector bore and a retainer ring that interlocks with the retainer tab or the base threading on the leading end of the male fitting connector to facilitate securing the male fitting connector to the female fitting connector without using a discrete threaded fastener or hot tooling.

12 Claims, 7 Drawing Sheets

(56) References Cited

U.S. PATENT DOCUMENTS

| | | | |
|---|---|---|---|
| 5,535,985 A * | 7/1996 | Larbuisson | F16L 37/086 |
| 5,584,512 A | 12/1996 | Carstensen | |
| 6,079,749 A | 6/2000 | Albino et al. | |
| 6,378,914 B1 | 4/2002 | Quaranta | |
| 6,394,507 B1 | 5/2002 | Baker | |
| 6,764,109 B2 | 7/2004 | Richardson et al. | |
| 6,840,548 B2 * | 1/2005 | Lacroix | 285/317 |
| 7,125,055 B2 | 10/2006 | Dallas | |
| 7,159,652 B2 | 1/2007 | McGuire et al. | |
| 7,222,889 B2 | 5/2007 | Breay | |
| 7,484,776 B2 | 2/2009 | Dallas et al. | |
| 7,604,058 B2 | 10/2009 | McGuire | |
| 7,984,932 B2 | 7/2011 | McGuire | |
| 8,733,801 B2 | 5/2014 | Larsson et al. | |
| 8,888,139 B2 | 11/2014 | Hunter | |
| 10,053,923 B2 | 8/2018 | Johnson et al. | |
| 10,393,294 B2 | 8/2019 | Ungchusri et al. | |
| 2005/0093294 A1 | 5/2005 | Anselmo et al. | |
| 2015/0292661 A1 | 10/2015 | Gilbreath et al. | |
| 2018/0163904 A1 | 1/2018 | Nguyen | |

FOREIGN PATENT DOCUMENTS

| | | |
|---|---|---|
| CN | 206973097 U | 2/2018 |
| EP | 3252363 A1 | 8/2020 |
| FR | 2372368 A1 | 11/1980 |
| GB | 734227 A | 7/1955 |
| GB | 740763 A | 11/1955 |
| GB | 773983 A | 3/1957 |
| RU | 192259 U1 | 9/2019 |
| WO | 2015086784 A1 | 6/2015 |
| WO | 2015088356 A1 | 6/2015 |
| WO | 2016167100 A1 | 10/2016 |
| WO | 2019137591 A1 | 7/2019 |
| WO | 2019143497 A1 | 7/2019 |

* cited by examiner

QUICK CONNECT PIPE FITTING SYSTEMS AND METHODS

BACKGROUND

The present disclosure generally relates to pipeline systems and, more particularly, to fitting connectors that may be used to secure (e.g., connect and/or attach) pipeline components, such as pipe fittings, to one another.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate fluid transportation, a pipeline system generally includes one or more pipe segments in addition to pipe (e.g., midline and/or end) fittings, which are used to connect a pipe segment to another pipeline component, such as another pipe fitting, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

To facilitate connecting a pipe segment to another pipeline component, the tubing of the pipe segment may generally be secured and sealed within a pipe fitting. In particular, to facilitate connecting the pipe segment to another pipeline component, the pipe fitting and the other pipeline component may each include a fitting connector. For example, in some instances, the fitting connectors may each include a flange (e.g., hub) and, thus, may be connected via bolts secured therethrough and/or a clamp bolted circumferentially around the flanges. However, tightening a threaded fastener, such as a bolt or a screw, is often a relatively time-consuming process, which, at least in some instances, may limit the efficiency with which pipeline components can be connected and, thus, pipeline deployment efficiency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a first pipeline component to be fluidly connected to a pipe segment, which includes tubing that defines a pipe bore and a fluid conduit within an annulus of the tubing, and a second pipeline component that includes a female fitting connector that defines a connector cavity. The first pipeline component includes a male fitting connector that defines a first connector bore and an outer surface of a leading end of the male fitting connector includes a retainer tab or base threading. The female fitting connector of the second pipeline component includes a base portion that defines a second connector bore and a retainer ring that interlocks with the retainer tab or the base threading on the outer surface of the leading end of the male fitting connector to facilitate securing the male fitting connector to the female fitting connector without using a discrete threaded fastener or hot tooling.

In another embodiment, a method of assembling a pipeline system includes aligning a first connector bore defined by a female fitting connector in a first pipeline component with a second connector bore defined by a male fitting connector in a second pipeline component, in which the female fitting connector defines a connector cavity and includes a retainer ring, and securing the male fitting connector to the female fitting connector at least in part by inserting a leading end of the male fitting connector into the connector cavity defined in the female fitting connector and engaging the retainer ring of the female fitting connector with an outer surface of the male fitting connector to facilitate fluidly connecting the first pipeline component and the second pipeline component via the first connector bore of the female fitting connector and the second connector bore of the male fitting connector without using a discrete threaded fastener or hot tooling.

In another embodiment, a system, includes a female fitting connector that defines a connector cavity, in which the female fitting connector is secured to or integrated with a first body of a first pipeline component and the female fitting connector includes a retainer ring and a base portion that defines a first connector bore, and a male fitting connector that defines a second connector bore. The male fitting connector is secured to or integrated with a second body of a second pipeline component and the male fitting connector is to be disposed within the connector cavity of the female fitting connector such that the retainer ring in the female fitting connector interlocks with an outer surface of the male fitting connector to facilitate fluidly connecting the first pipeline component and the second pipeline component via the first connector bore of the female fitting connector and the second connector bore of the male fitting connector.

DETAILED DESCRIPTION

Figure 1:
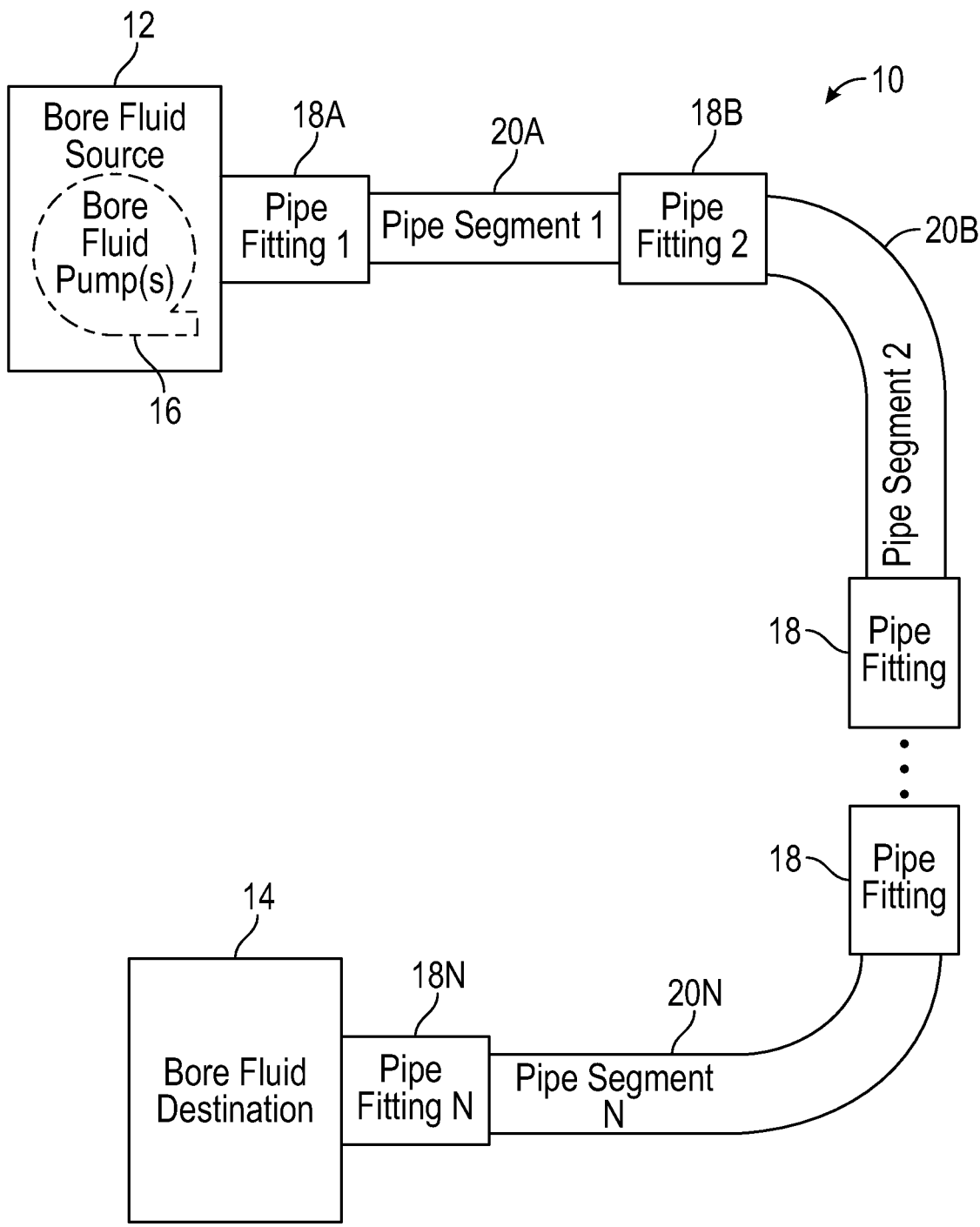
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure relates to pipeline systems, which generally include pipe segments secured and sealed in pipe fittings, such as a midline pipe fitting and/or a pipe end fitting. To facilitate connecting a pipe segment secured therein to another pipeline component, such as another pipe fitting, a fluid source, or a fluid destination, a pipe fitting and the other pipeline component may each include a fitting connector. In some instances, the fitting connectors on the pipe fitting and the other pipeline component may each include a flange and, thus, may be connected via bolts secured therethrough and/or a clamp bolted circumferentially around the flanges. However, tightening a threaded fastener, such as a bolt or a screw, is often a relatively time-consuming process, which, at least in some instances, may limit the efficiency with which pipeline components can be connected and, thus, pipeline deployment efficiency.

To facilitate improving pipeline deployment efficiency, the present disclosure provides techniques for implementing and/or assembling a pipeline system with quick connect fitting connectors, for example, which do not utilize discrete threaded fasteners, such as bolts or screws, to connect corresponding pipeline components. As will be described in more detail below, a pair of quick connect fitting connectors may include a female fitting connector, which defines a connector cavity, and a male fitting connector, which is to be secured within the connector cavity. In particular, in some embodiments, the female fitting connector may include a base portion, which defines its connector cavity, and an inwardly biased (e.g., internal) retainer ring, which is disposed within the connector cavity and has a ring protrusion on its leading inner edge. Additionally, in such embodiments, the outer surface of a leading end of the male fitting connector may include a retainer tab, which extends radially outward. Accordingly, in such embodiments, the pair of quick connect fitting connectors and, thus, corresponding pipeline components may be secured to one another (e.g., assembled) simply by stabbing (e.g., inserting) the male fitting connector into the connector cavity defined by the female fitting connector such that the retainer tab on the male fitting connector slides under and interlocks (e.g., engages) with the ring protrusion on the retainer ring, for example, with the assistance of special-purpose (e.g., hydraulic) deployment equipment.

However, in other embodiments, the female fitting connector in a pair of quick connect fitting connectors may include a (e.g., external) retainer ring rotatably secured to its base portion to define its connector cavity. In particular, in such embodiments, the retainer ring may have ring threading on its inner surface while a leading end of a corresponding male fitting connector may have base threading on its outer surface. Accordingly, in such embodiments, the pair of quick connecting fitting connectors and, thus, corresponding pipeline components may be secured to one another by inserting the leading end of the male fitting connector into the connector cavity defined by the retainer ring and rotating the retainer ring relative the male fitting connector such that the ring threading on the retainer ring and the base threading on the male fitting connector threadingly interlock. In this manner, as will be described in more detail below, quick connect fitting connectors may be implemented and/or assembled to enable corresponding pipeline components to be secured to one another without using discrete threaded fasteners, such as a bolt or a screw, or hot tooling, such as welding or brazing, which, at least in some instances, may facilitate decreasing the time it takes to secure the pipeline components to one another, thereby improving pipeline deployment efficiency.

An example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be included at the bore fluid source 12, for example, when fluid flow through the bore of the pipeline system 10 is produced by gravity. Additionally or alternatively, in other embodiments, one or more bore fluid pumps 16 may be included in the pipeline system 10 and/or at the bore fluid destination 14.

To facilitate transporting fluid from the bore fluid source 12 to the bore fluid destination 14, as in the depicted example, a pipeline system 10 may include pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may include multiple different layers. For example, the tubing of a pipe segment 20 may include a first high-density polyethylene (e.g., internal corrosion protection) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material within its annulus. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
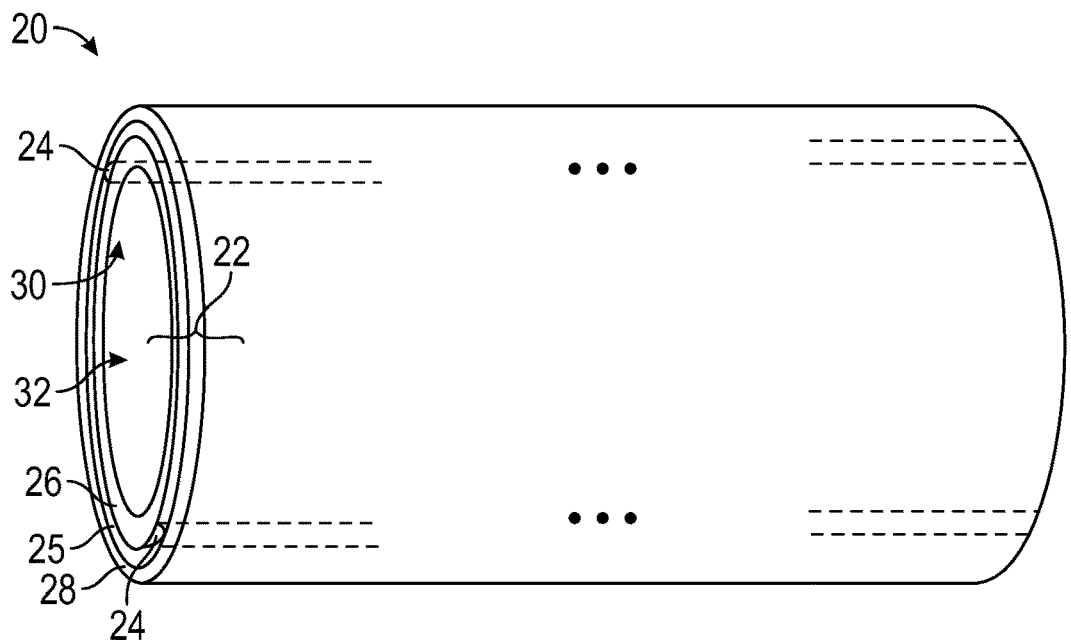
FIG. 2 is a side view of an example of a pipe segment that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 has multiple layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures having two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is defined between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32 of the pipe segment 20.

Figure 3:
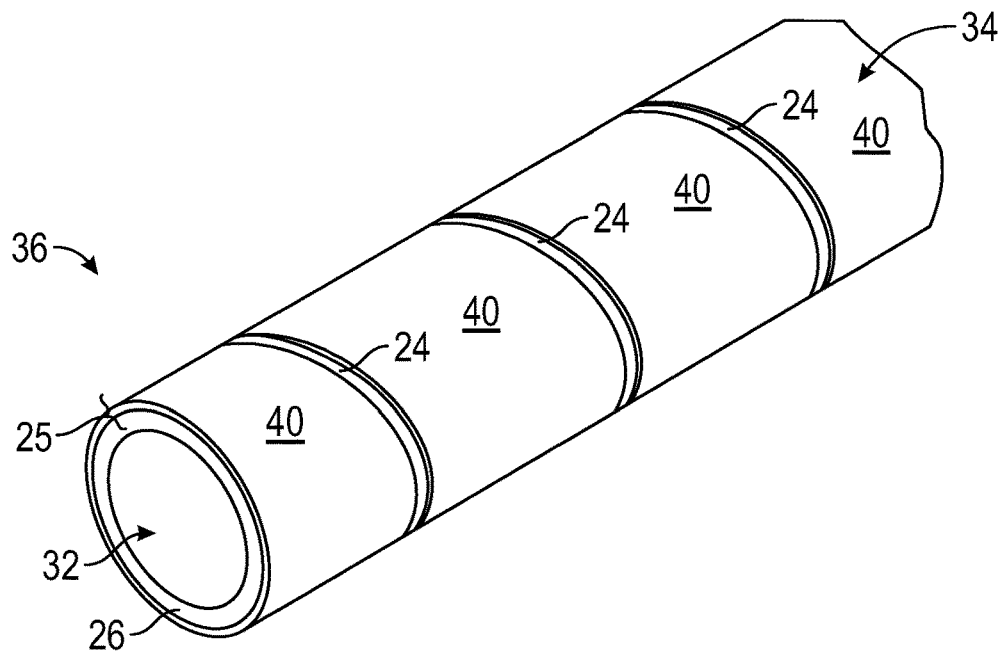
FIG. 3 is an example of a portion of a pipe segment of FIG. 2 with a helically shaped fluid conduit defined within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be composite material and/or metal, such as carbon steel, stainless steel, duplex stainless steel, super duplex stainless steel, or any combination thereof. In other words, at least in some such embodiments, an intermediate layer 34 of the pipe segment tubing 22 may be made using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-two degrees) relative to the longitudinal extent of the pipe bore 32. In any case, as depicted, the resulting fluid conduit 24 runs helically along the pipe segment 20, for example, such that the fluid conduit 24 is skewed fifty-two degrees relative to the longitudinal extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, in some instances, a pipe segment 20 may be deployed in an elevated pressure environment, for example, underwater in a subsea application. To facilitate improving the collapse and/or crush resistance of its tubing 22, a carcass layer may be disposed within the inner barrier layer 26 of the pipe segment 20. In other words, in such instances, the inner barrier layer 26 may be disposed around the carcass layer and, thus, the carcass layer may be the innermost layer of the pipe segment tubing 22.

Figure 4:
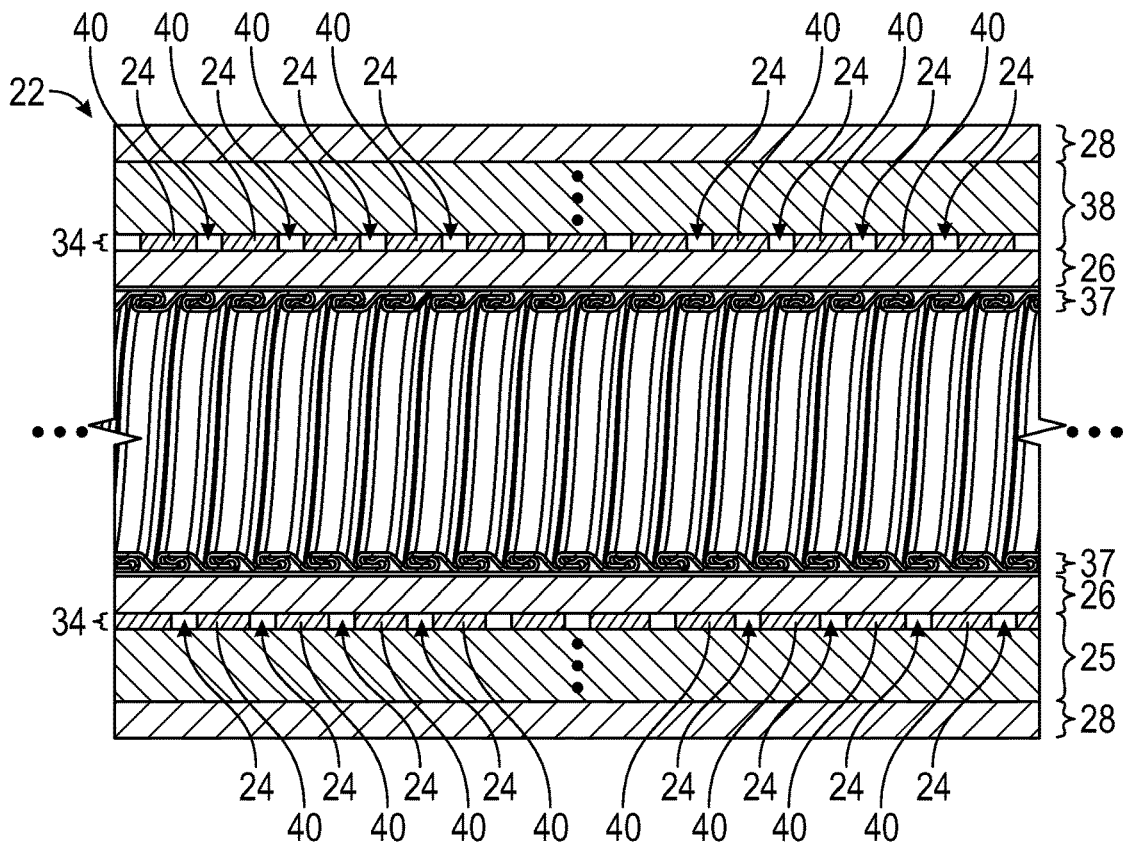
FIG. 4 is an axial cross-section profile of an example of a pipe segment that includes a carcass layer, in accordance with an embodiment of the present disclosure.

To help illustrate, an example of pipe segment tubing 22 that includes a carcass layer 37 is shown in FIG. 4. To facilitate improving collapse and/or crush resistance, in some embodiments, the carcass layer 37 may be made from metal, such as carbon steel, stainless steel, duplex stainless steel, super duplex stainless steel, or any combination thereof. Additionally, as depicted, the carcass layer 37 is an interlocked layer in the pipe segment tubing 22.

In addition to the carcass layer 37, as depicted, the pipe segment tubing 22 includes an inner barrier (e.g., liner) layer 26 and an outer barrier (e.g., sheath) layer 28. Furthermore, as depicted, the pipe segment tubing 22 includes intermediate layers 38 disposed between the inner barrier layer 26 and the outer barrier layer 28 and, thus, in the annulus 25 of the pipe segment tubing 22. In particular, as depicted, the intermediate layers 38 include at least a reinforcement layer 34 with one or more reinforcement strips 40 that are implemented to define one or more annular gaps (e.g., fluid conduits and/or free space) 24 in the tubing annulus 25.

However, it should be appreciated that the depicted example is merely intended to be illustrative and not limiting. In particular, as mentioned above, in some embodiments, the intermediate layers 38 of pipe segment tubing 22 may additionally or alternatively include one or more tape layers, one or more intermediate sheath layers, one or more anti-wear layers, one or more insulation layers, or any combination thereof. Additionally, as described above, in some embodiments, pipe segment tubing 22 may include multiple reinforcement layers 34, which each include one or more reinforcement strips 40. Moreover, although the present disclosure describes examples that include a carcass layer 37, it should be appreciated that the techniques described in the present disclosure may additionally or alternatively be used with pipe segment tubing 22 that does not include a carcass layer 37. In any case, as described above, in a pipeline system 10, the tubing 22 of a pipe segment 20 may generally be secured and sealed in a pipe fitting 18.

Figure 5:
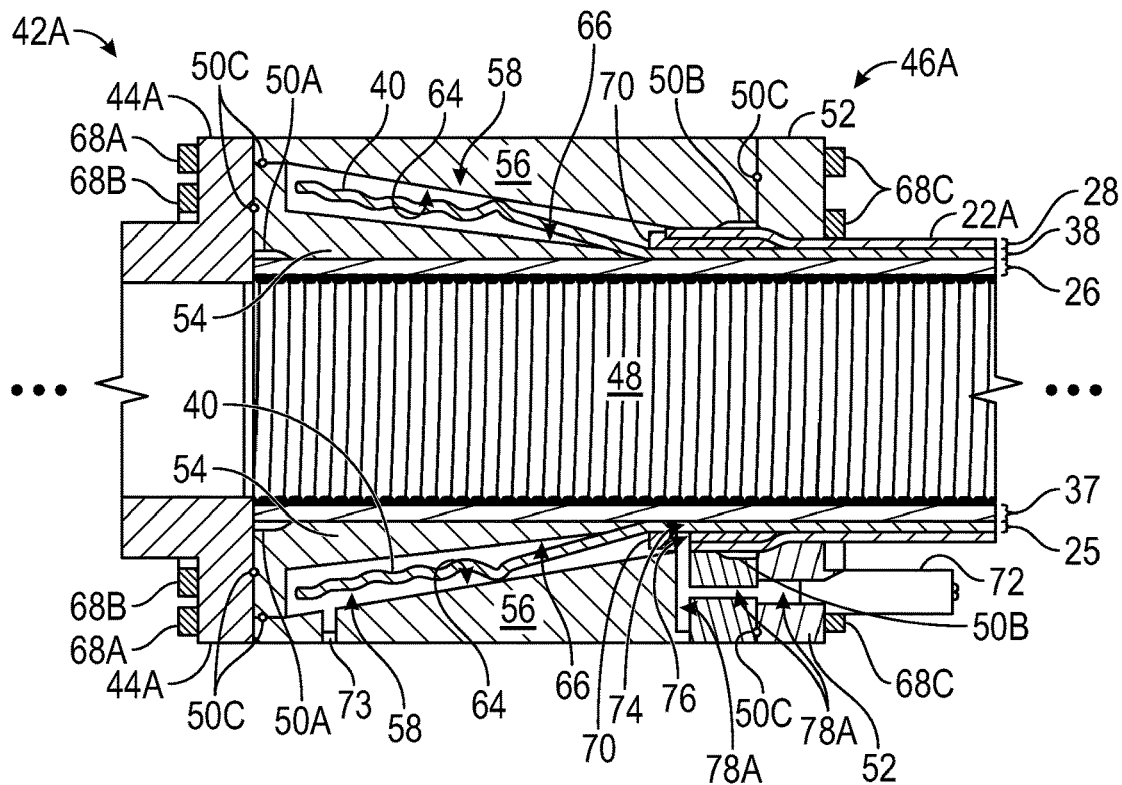
FIG. 5 is an axial cross-section profile of an example of a portion of a pipe fitting—namely a potted pipe fitting—secured to pipe segment tubing, in accordance with an embodiment of the present disclosure.
Figure 6:
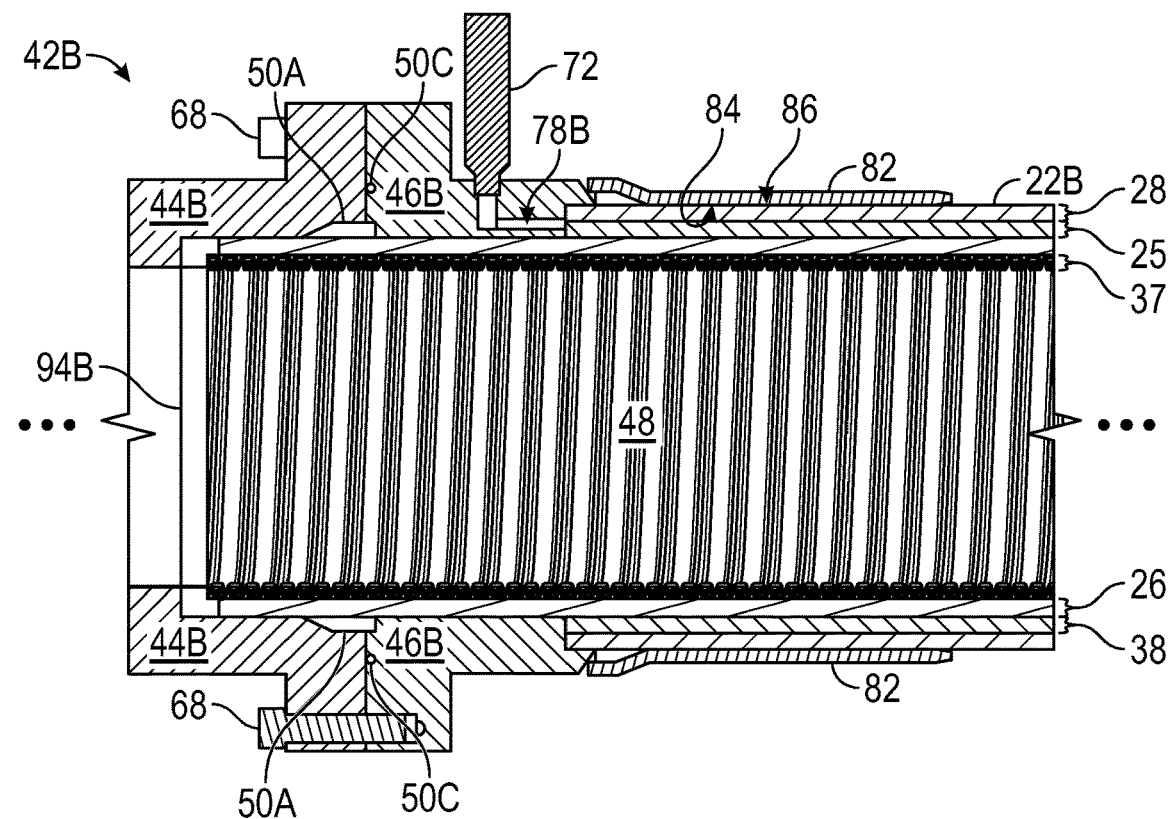
FIG. 6 is an axial cross-section profile of another example of a portion of a pipe fitting—namely a swaged pipe fitting—secured to pipe segment tubing, in accordance with an embodiment of the present disclosure.
Figure 7:
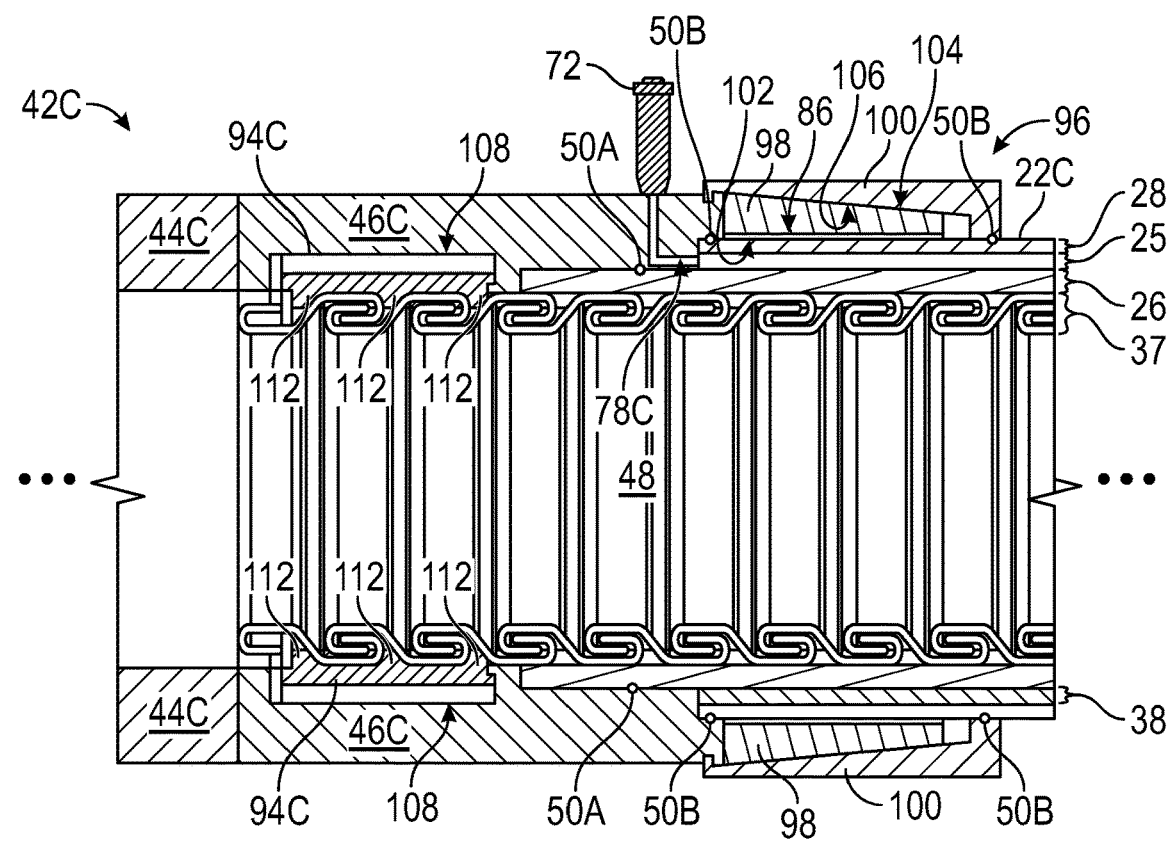
FIG. 7 is an axial cross-section profile of a further example of a portion of a pipe fitting—namely a reusable (e.g., non-potted, non-swaged) pipe fitting—secured to pipe segment pipe segment tubing, in accordance with an embodiment of the present disclosure.

To help illustrate, examples of portions 42 of pipe fittings 18 secured to pipe segment tubing 22 are shown in FIGS. 5-7. In particular, the portions 42 of the pipe fittings 18 each exclude a portion of a fitting connector of the pipe fitting 18. In some instances, the excluded portion of the fitting connector may be a flange, for example, which enables the fitting connector and, thus, a corresponding pipe fitting 18 to be secured to a fitting connector on another pipeline component via one or more discrete threaded fasteners. However, as will be described in more detail below, a fitting connector of a pipe fitting 18 may alternatively be a quick connect fitting connector, for example, which may be secured to a fitting connector on another pipeline component without using a discrete threaded fastener.

In any case, an example of a portion 42A of a pipe fitting 18—namely a potted pipe fitting 18—and pipe segment tubing 22A is shown in FIG. 5. Although only a portion is depicted, to facilitate securement to another pipeline component, such as another pipe fitting 18, a bore fluid source 12, or a bore fluid destination 14, as in the depicted example, a pipe fitting 18 may generally include a fitting connector 44. In particular, in some instances, the undepicted portion of the fitting connector 44A may include a flange (e.g., hub) and, thus, the fitting connector 44A may be connected to another fitting connector 44 via bolts secured therethrough and/or a clamp bolted circumferentially around the flanges.

Additionally, as in the depicted example, a pipe fitting 18 may generally include a fitting body 46, which defines a body (e.g., fitting) bore 48. In particular, in the depicted example, the fitting body 46A includes a fitting collar 52, an inner fitting body 54, and an outer fitting body 56. The inner fitting body 54 may be disposed between the inner barrier layer 26 and one or more reinforcement strips 40 of the pipe segment tubing 22A while the outer fitting body 56 may be disposed around the one or more reinforcement strips 40 of the pipe segment tubing 22. In particular, when the outer fitting body 56 and the inner fitting body 54 are secured to the fitting connector 44A, a potting cavity 58 in which one or more reinforcement strips 40 of the pipe segment tubing 22A are to be anchored in the pipe fitting 18 may be defined between an inner surface 64 of the outer fitting body 56 and an outer surface 66 of the inner fitting body 54. To enable one or more reinforcement strips 40 of the pipe segment tubing 22A to be anchored in the potting cavity 58, the outer barrier layer 28 of the pipe segment tubing 22A may be cut back relative to the one or more reinforcement strips 40.

Furthermore, to facilitate securing its fitting body 46 to its fitting connector 44, as in the depicted example, in some embodiments, a pipe fitting 18 may include one or more threaded fasteners 68, as a bolt or a screw. In particular, in the depicted example, the portion 42 of the potted pipe fitting 18 includes first threaded fasteners 68A, which are used to secure the fitting connector 44A to the outer fitting body 56, and second threaded fasteners 68B, which are used to secure the fitting connector 44A to the inner fitting body 54. Additionally, the portion 42 of the swaged pipe fitting 18 includes third threaded fasteners 68C, which are used to secure the fitting collar 52 to the outer fitting body 56.

Moreover, as in the depicted example, to facilitate sealing pipe segment tubing 22 therein, a pipe fitting 18 may generally include one or more fitting seals 50. In particular, in the depicted example, the portion 42A of the potted pipe fitting 18 includes an inner seal ring 50A, which may be compressed between the fitting connector 44A, the inner fitting body 54, and the inner barrier layer 26 of the pipe segment tubing 22A. Additionally, the portion 42A of the potted pipe fitting 18 includes an outer seal ring 50B, which may be compressed between the outer fitting body 56, the fitting collar 52 of the pipe fitting 18, and the outer barrier layer 28 of the pipe segment tubing 22A. In addition to an inner seal ring 50A and an outer seal ring 50B, as in the depicted example, a potted pipe fitting 18 may include one or more face seals 50C, such as a face seal 50C secured between its fitting connector 44 and its outer fitting body 56, a face seal 50C secured between its fitting connector 44 and its inner fitting body 54, a face seal 50C secured between its outer fitting body 56 and its fitting collar 52, or any combination thereof.

To facilitate separating (e.g., isolating) the sealing function provided by its outer seal ring 50B from the reinforcement function provided by one or more reinforcement strips 40 of pipe segment tubing 22, as in the depicted example, in some embodiments, a potted pipe fitting 18 may additionally include a reinforcement sleeve 70, which is inserted between a (e.g., non-cutback) portion of the outer barrier layer 28 the pipe segment tubing 22 and a corresponding portion of the one or more reinforcement strips 40. In particular, to facilitate separating the sealing function from the reinforcement function, the reinforcement sleeve 70 may be formed from material that has a higher linear elasticity modulus (e.g., stiffness) than solid material that is used to form the outer barrier layer 28 of the pipe segment tubing 22. For example, while the outer barrier layer 28 is formed using plastic, the reinforcement sleeve 70 may be formed at least in part using metal, such as carbon steel, stainless steel, duplex stainless steel, super duplex stainless steel, or any combination thereof.

In any case, as described above, in some embodiments, one or more intermediate (e.g., reinforcement) layers 38 in pipe segment tubing 22 may define free space (e.g., one or more annular gaps 24) within the annulus 25 of the pipe segment tubing 22. To facilitate venting fluid from the annulus 25 of the pipe segment tubing 22, the portion 42A of the potted pipe fitting 18 additionally includes a vent valve 72, which is fluidly connected to free space (e.g., one or more annular gaps 24) defined within the annulus 25 of the pipe segment tubing 22A. In particular, in the depicted example, the vent valve 72 is fluidly connected to the annulus 25 of the pipe segment tubing 22A via a first opening 74 formed through the reinforcement sleeve 70, a second opening 76 formed through the outer barrier layer 28 of the pipe segment tubing 22A, and fluid paths 78A formed in the fitting body 46A (e.g., outer fitting body 56 and fitting collar 52). In this manner, the vent valve 72 may be used to selectively vent fluid from within the annulus 25 of the pipe segment tubing 22A.

However, it should be appreciated that the depicted example is merely intended to be illustrative and not limiting. In particular, it should be appreciated that the techniques described in the present disclosure are not limited to the specific potted pipe fitting configuration shown in FIG. 5. For example, in other embodiments, the portion 42A of the potted pipe fitting 18 may not include a reinforcement sleeve 70 and/or a vent valve 72.

In any case, to facilitate flowing fluid (e.g., liquid) potting material, such as epoxy, into its potting cavity 58, the portion 42A of the potted pipe fitting 18 includes a potting material port 73, which is formed through the outer fitting body 56 and fluidly connected to the potting cavity 58. After curing, a solid mass of cured potting material (e.g., epoxy) may encase the portion of one or more reinforcement strips 40 present in the potting cavity 58. In other words, the cured potting material may bond to (e.g., grab onto) the portion of the one or more reinforcement strips 40 present in the potting cavity 58, thereby facilitating anchoring of the one or more reinforcement strips 40 in the potting cavity 58 and, thus, securement of the pipe segment tubing 22A in the portion 42A of the potted pipe fitting 18.

However, it should again be appreciated that the depicted example is merely intended to be illustrative and not limiting. In particular, it should be appreciated that the techniques described in the present disclosure are not limited to a specific type of pipe fitting 18, such as the potted pipe fitting 18 of FIG. 5. For example, the techniques described in the present disclosure may additionally or alternatively be applied to other types of pipe fittings 18, such as a swaged pipe fitting 18.

To help illustrate, an example of a portion 42B of a swaged pipe fitting 18 and pipe segment tubing 22B is shown in FIG. 6. Although only a portion is depicted, similar to the potted pipe fitting 18 of FIG. 5, the swaged pipe fitting 18 of FIG. 6 includes a fitting connector 44B. Additionally, similar to the potted pipe fitting 18 of FIG. 5, the swaged pipe fitting 18 of FIG. 6 includes a fitting body 46B, which defines a body (e.g., fitting) bore 48.

Furthermore, similar to the potted pipe fitting 18 of FIG. 5, to facilitate securing its fitting body 46B to its fitting connector 44B, the portion 42B of the swaged pipe fitting 18 includes threaded fasteners 68, as bolts or screws. Additionally, similar to the potted pipe fitting 18 of FIG. 5, to facilitate sealing pipe segment tubing 22 therein, the portion 42B of the swaged pipe fitting 18 includes fitting seals 50. In particular, the portion 42B of the swaged pipe fitting 18 includes a seal ring 50A, which may be compressed between the fitting connector 44B, the fitting body 46B, and the inner barrier layer 26 of the pipe segment tubing 22B. To enable the seal ring 50A to be compressed against the inner barrier layer 26, the outer barrier layer 28 and each intermediate (e.g., reinforcement) layer 38 in the pipe segment tubing 22 may be cut back relative to the inner barrier layer 26. In addition to the seal ring 50A, the portion 42B of the swaged pipe fitting 18 includes a face seal 50C secured between its fitting connector 44B and its fitting body 46B.

Moreover, similar to the potted pipe fitting 18 of FIG. 5, to facilitate venting fluid from the annulus 25 of the pipe segment tubing 22B, the portion 42B of the swaged pipe fitting 18 includes a vent valve 72, which is fluidly connected to free space (e.g., one or more annular gaps 24) defined within the annulus 25 of the pipe segment tubing 22B. In particular, in the depicted example, the vent valve 72 is fluidly connected to the annulus 25 of the pipe segment tubing 22B via a fluid path 78B formed in the fitting body 46B. In this manner, the vent valve 72 may be used to selectively vent fluid from within the annulus 25 of the pipe segment tubing 22B.

However, as depicted in FIG. 6, the portion 42B of the swaged pipe fitting 18 additionally includes a carcass ring 94—namely a carcass isolating ring 94B. Generally, a pipe fitting 18 may include a carcass isolating ring 94B to facilitate electrically isolating the carcass layer 37 of pipe segment tubing 22 from the remainder of the pipe fitting 18. Thus, in some embodiments, a carcass isolating ring 94B may be made from an electrical insulative material, such as a polymer and/or plastic.

Moreover, as depicted in FIG. 6, the swaged pipe fitting 18 additionally includes a fitting jacket 82 secured (e.g., welded) to its fitting body 46B. In particular, in FIG. 6, the fitting jacket 82 is shown in a swaged state in which its inner surface 84 engages an outer surface 86 of the pipe segment tubing 22B, thereby facilitating securement of the pipe segment tubing 22B in the swaged pipe fitting 18. Before being swaged, the fitting jacket 82 may be in an unswaged state in which open space is present between its inner surface 84 and the outer surface 86 of the pipe segment tubing 22B, thereby enabling the pipe segment tubing 22B to move relatively freely into and/or out from the swaged pipe fitting 18. To transition a fitting jacket 82 of a swaged pipe fitting 18 from an unswaged state to a swaged state, in some embodiments, special-purpose deployment equipment—namely a swage machine—may be coupled to the swaged pipe fitting 18 and operated to conformally deform the fitting jacket 82 around pipe segment tubing 22 at least in part by moving a die over the fitting jacket 82.

However, it should be appreciated that the depicted example is merely intended to be illustrative and not limiting. In particular, it should be appreciated that the techniques described in the present disclosure are not limited to the specific swaged pipe fitting configuration shown in FIG. 6. For example, in other embodiments, the portion 42B of the swaged pipe fitting 18 may not include a vent valve 72 and/or a carcass isolating ring 94B. Additionally or alternatively, in some embodiments, the portion 42B of the swaged pipe fitting 18 may include a (e.g., temporary) support cylinder, which is inserted directly adjacent to the carcass layer 37 of the pipe segment tubing 22 to facilitate supporting the pipe segment tubing 22 during swaging. Moreover, it should again be appreciated that the techniques described in the present disclosure are not limited to a specific type of pipe fitting 18, such as the swaged pipe fitting 18 of FIG. 6, and can additionally or alternatively applied to other types of pipe fittings 18, such as a reusable (e.g., non-swaged, non-potted) pipe fitting 18.

To help illustrate, an example of a portion 42C of a reusable pipe fitting 18 and pipe segment tubing 22C is shown in FIG. 7. Although only a portion is depicted, similar to the potted pipe fitting 18 of FIG. 5 and the swaged pipe fitting 18 of FIG. 6, the reusable pipe fitting 18 of FIG. 7 includes a fitting connector 44C. Additionally, similar to the potted pipe fitting 18 of FIG. 5 and the swaged pipe fitting 18 of FIG. 6, the reusable pipe fitting 18 of FIG. 7 includes a fitting body 46C, which defines a body (e.g., fitting) bore 48.

However, as depicted in FIG. 7, the fitting connector 44C is not secured to the fitting body 46C via threaded fasteners 68. Instead, in such embodiments, a fitting connector 44 may be secured to a corresponding fitting body 46 using hot tooling, such as welding and/or brazing. In fact, in some embodiments, a pipe fitting 18 may include a fitting body 46 with an integrated fitting connector 44 and, thus, a fitting connector section instead of a discrete (e.g., separate) fitting connector 44. Moreover, as depicted in FIG. 7, the portion 42C of the reusable pipe fitting 18 additionally has a pipe engaging assembly 96, which includes a collapsible collar 98 and an activation collar 100.

Nevertheless, similar to the potted pipe fitting 18 of FIG. 5 and the swaged pipe fitting 18 of FIG. 6, to facilitate venting fluid from the annulus 25 of the pipe segment tubing 22C, the portion 42C of the reusable pipe fitting 18 includes a vent valve 72, which is fluidly connected to free space (e.g., one or more annular gaps 24) defined within the annulus 25 of the pipe segment tubing 22B. In particular, in the depicted example, the vent valve 72 is fluidly connected to the annulus 25 of the pipe segment tubing 22 via a fluid path 78C formed in the fitting body 46B. In this manner, the vent valve 72 may be used to selectively vent fluid from within the annulus 25 of the pipe segment tubing 22C.

Additionally, similar to the potted pipe fitting 18 of FIG. 5 and the swaged pipe fitting 18 of FIG. 6, to facilitate sealing pipe segment tubing 22 therein, the portion 42C of the reusable pipe fitting 18 in FIG. 7 includes fitting seals 50. In particular, the portion 42C of the reusable pipe fitting 18 includes an inner seal ring 50A, which may be compressed between the fitting body 46C and the inner barrier layer 26 of the pipe segment tubing 22C. To enable the inner seal ring 50A to be compressed against the inner barrier layer 26, the outer barrier layer 28 and each intermediate layer 38 in the pipe segment tubing 22C may be cut back relative to the inner barrier layer 26. Additionally, the portion 42C of the reusable pipe fitting 18 includes an outer seal ring 50B, which may be compressed between the fitting body 46C and the outer barrier layer 28 of the pipe segment tubing 22C, and another outer seal ring 50B, which may be compressed between the outer barrier layer 28 of the pipe segment tubing 22C and the activation collar 100 in the pipe engaging assembly 96.

To facilitate selectively securing the reusable pipe fitting 18 to pipe segment tubing 22, the pipe engaging assembly 96 may be selectively transitioned between an activated state and a deactivated state. In particular, the pipe engaging assembly 96 may be transitioned toward its activated state at least in part by contracting the collapsible collar 98 of the pipe engaging assembly 96 radially inward such that the inner surface 102 of the collapsible collar 98 engages the outer surface 86 of the pipe segment tubing 22C, thereby facilitating securement of the reusable pipe fitting 18 to the pipe segment tubing 22C. In fact, to facilitate improving securement strength, in some embodiments, the inner surface 102 of the collapsible collar 98 may include one or more teeth (e.g., serrations) that extend radially inward. In any case, the pipe engaging assembly 96 may be transitioned toward its deactivated state at least in part by expanding the collapsible collar 98 radially outward such that the inner surface 102 of the collapsible collar 98 disengages from the outer surface 86 of the pipe segment tubing 22C, thereby enabling the reusable pipe fitting 18 to be removed from the pipe segment tubing 22C, for example, for re-deployment at other pipe segment tubing 22.

To enable its inner surface diameter to be adaptively adjusted, the collapsible collar 98 in a pipe engaging assembly 96 may include multiple collar (e.g., "dog") segments implemented (e.g., formed) such that open space is present between adjacent collar segments at least while the pipe engaging assembly 96 is in its deactivated state. For example, in some embodiments, the collapsible collar 98 in a pipe engaging assembly 96 may include multiple separate collar segments. However, in other embodiments, the collapsible collar 98 in a pipe engaging assembly 96 may be a ring with slits cut therethrough to partially separate adjacent collar segments.

In any case, to facilitate controlling the inner surface diameter of the collapsible collar 98 and, thus, the activation state of the pipe engaging assembly 96, as depicted, the activation collar 100 is disposed circumferentially around (e.g., over or surrounding) the collapsible collar 98. Additionally, as depicted, the collapsible collar 98 has a male taper and, thus, a conical outer surface 104 and a wedge-shaped axial cross-section profile. On the other hand, the activation collar 100 has a female taper (e.g., socket) and, thus, a conical inner surface 106 and a wedge-shaped axial cross-section profile.

Due to the collar slopes, transitioning the activation collar 100 to different positions on the collapsible collar 98 may affect (e.g., expand or contract) the inner surface diameter of the collapsible collar 98. For example, moving (e.g., transitioning) the activation collar 100 from a first position on the collapsible collar 98 to a second (e.g., activated) position, which covers more of the collapsible collar 98, may contract (e.g., collapse and/or compress) the collapsible collar 98 radially inward, for example, such that the inner surface diameter of the collapsible collar 98 is reduced to less than or equal to a default (e.g., uncompressed) outer surface diameter of the pipe segment tubing 22C. On the other hand, moving the activation collar 100 from the second position on the collapsible collar 98 to the first (e.g., deactivated) position on the collapsible collar 98, which covers less of the collapsible collar 98, may enable the collapsible collar 98 to expand radially outward (e.g., due to material spring back), for example, such that the inner surface diameter of the collapsible collar 98 expands to greater than the default outer surface diameter of the pipe segment tubing 22C.

As depicted, the portion 42C of the reusable pipe fitting 18 additionally includes a carcass ring 94—namely a carcass anchoring ring 94C, which is disposed within a carcass ring cavity 108 defined in the fitting body 46C. Generally, a pipe fitting 18 may include a carcass anchoring ring 94C to facilitate anchoring the carcass layer 37 of pipe segment tubing 22 therein. To facilitate anchoring a corresponding carcass layer 37, as in the depicted example, a carcass anchoring ring 94C may include protrusions 112 that extend radially inward to enable the carcass anchoring ring 94C to interlock with contours on the outer surface of the carcass layer 37. To enable a carcass anchoring ring 94C to engage the outer surface of a carcass layer 37 in pipe segment tubing 22, the inner barrier layer 26 of the pipe segment tubing 22C may be cut back relative to the carcass layer 37. Additionally, to enable a carcass anchoring ring 94C to engage (e.g., grip and/or grab onto) the outer surface of a carcass layer 37, in some embodiments, the carcass anchoring ring 94C may be made from spring metal, such as spring steel. Thus, in such embodiments, the reusable pipe fitting 18 may be deployed at the pipe segment tubing 22C at least in part by stabbing (e.g., inserting) the pipe segment tubing 22C into the body bore 48 of the reusable pipe fitting 18 such that contours on the outer surface of its carcass layer 37 cause the carcass anchoring ring 94C to expand around and grab onto the carcass layer 37.

However, it should be appreciated that the depicted example is merely intended to be illustrative and not limiting. In particular, it should be appreciated that the techniques described in the present disclosure are not limited to the specific reusable (e.g., non-potted, non-swaged) pipe fitting configuration shown in FIG. 7. For example, in other embodiments, the portion 42C of the reusable pipe fitting 18 may not include a vent valve 72 and/or or a carcass anchoring ring 94C. Alternatively, in other embodiments, the portion 42C of the reusable pipe fitting 18 may include a carcass anchoring ring 94C secured to the inner surface of the carcass layer 37 of pipe segment tubing 22.

In any case, as mentioned above, a pipe fitting 18 may generally include a fitting connector 44 to enable the pipe fitting 18 to be secured to another pipeline component, such as another pipe fitting 18, a bore fluid source 12, or a bore fluid destination 14, in addition to pipe segment tubing 22. In particular, in some instances, the fitting connector 44 on the pipe fitting 18 may include a flange. Thus, in such instances, the pipe fitting 18 may be secured to the other pipeline component, which also includes a fitting connector 44 with a flange, via bolts secured through the flanges and/or a clamp bolted circumferentially around the flanges. However, tightening a threaded fastener, such as a bolt or a screw, is often a relatively time-consuming process, which, at least in some instances, may limit the efficiency with which pipeline components can be connected and, thus, pipeline deployment efficiency.

To facilitate improving pipeline deployment efficiency, the present disclosure provides techniques for implementing and/or assembling a pipeline system 10 with quick connect fitting connectors 44, for example, which can be used to connect corresponding pipeline components without using discrete threaded fasteners 68, such as screws or bolts. As will be described in more detail below, adjacent pipeline components may be secured together using a pair of corresponding quick connect fitting connectors 44. Each pair of quick connect fitting connectors 44 may include a female fitting connector, which defines a connector cavity, and a male fitting connector, which is to be secured within the connector cavity.

Figure 8:
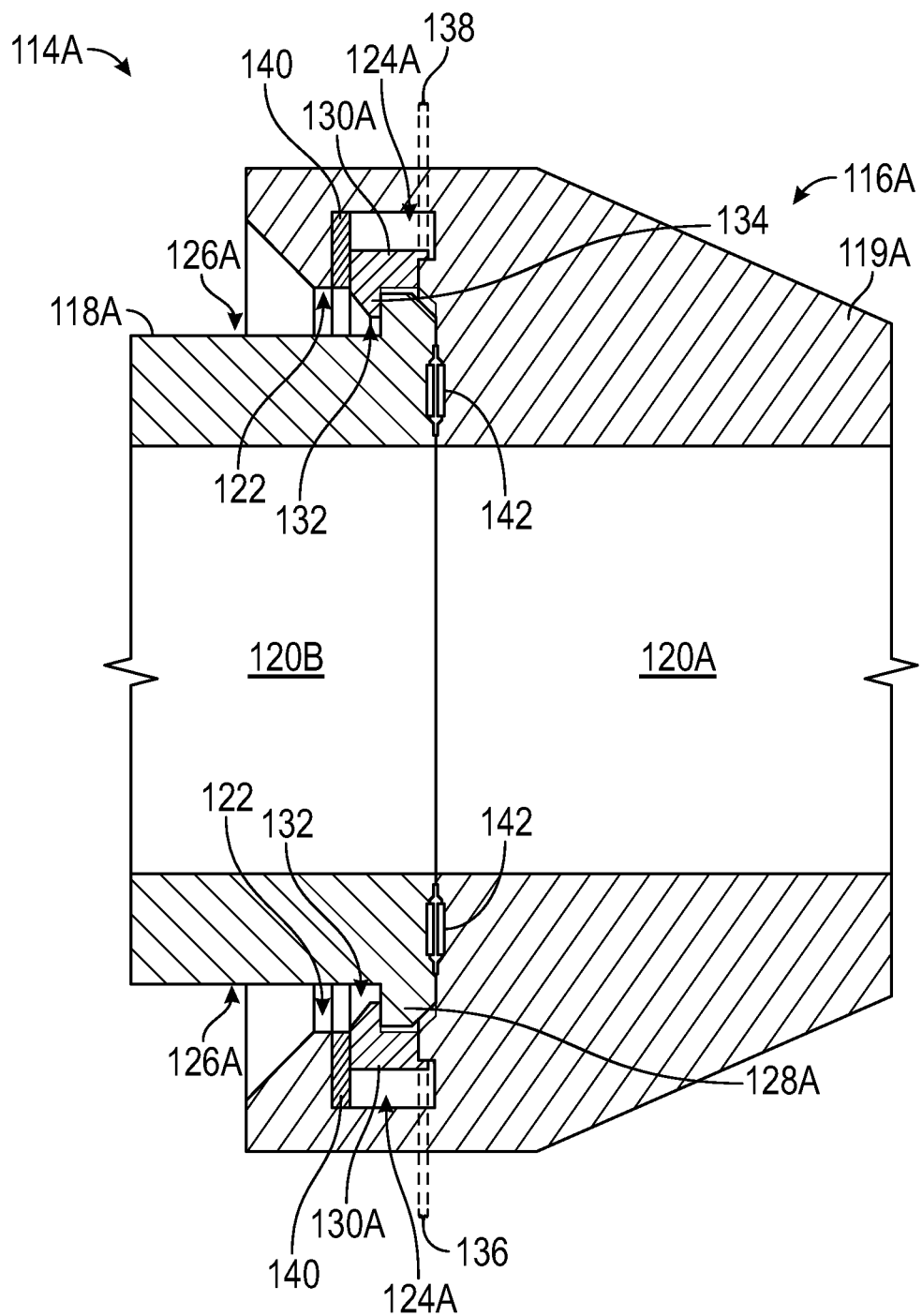
FIG. 8 is an axial cross-section profile of an example of a pair of fitting connectors, in accordance with an embodiment of the present disclosure.

To help illustrate, an example of a quick connect fitting connector pair 114A is shown in FIG. 8. As depicted, the quick connect fitting connector pair 114A includes fitting connectors 44—namely a female fitting connector 116A and a male fitting connector 118A. As described above, in some embodiments, a fitting connector 44 (e.g., female fitting connector 116 or male fitting connector 118) of a pipe fitting 18 may be discrete component and, thus, bolted and/or welded to the fitting body 46 of the pipe fitting 18.

However, as described above, in other embodiments, a fitting connector 44 (e.g., female fitting connector 116 or male fitting connector 118) of a pipe fitting 18 may be integrated with the fitting body 46 of the pipe fitting 18. In other words, in such embodiments, the female fitting connector 116A may be a fitting connector section in the fitting body 46 of a pipe fitting 18. Additionally or alternatively, the male fitting connector 118A may be fitting connector section in the fitting body 46 of another pipe fitting 18.

Although primarily described using pipe fittings examples, it should be appreciated that the techniques described in the present disclosure are not limited to pipe fittings 18. In particular, as described above, fitting connectors 44 may be used to connect a pipe fitting 18 to another pipeline component, such as a bore fluid source 12 or a bore fluid destination 14. Thus, it should be appreciated the techniques described in the present disclosure can also be applied to fitting connectors 44 in other types of pipeline components, such as a bore fluid source 12 or a bore fluid destination 14.

In any case, as depicted, the female fitting connector 116A includes a base portion 119A, which defines a (e.g., first) connector (e.g., fitting) bore 120A, while the male fitting connector 118A defines another (e.g., second) connector bore 120B. To facilitate securing the male fitting connector 118A to the female fitting connector 116A and, thus, fluidly connecting the connector bores 120, the inner surface 122 of the base portion 119A in the female fitting connector 116A additionally defines a connector cavity 124A while the outer surface 126A of a leading end of the male fitting connector 118A has a retainer tab (e.g., protrusion) 128A that extends radially outward. Furthermore, the female fitting connector 116A includes a (e.g., internal) retainer ring 130A disposed within its connector cavity 124A.

In particular, as depicted, the inner surface 132 of a leading end of the retainer ring 130 has a ring protrusion 134 that extends radially inward. Additionally, in the depicted example, the ring protrusion 134 on the retainer ring 130 is interlocked with the retainer tab 128A on the male fitting connector 118A, thereby facilitating securement of the male fitting connector 118A to the female fitting connector 116A. Thus, in such embodiments, the male fitting connector 118A may be secured to the female fitting connector 116A simply by stabbing the leading end of the male fitting connector 118A into the female fitting connector 116A such that the retainer tab 128A on the male fitting connector 118A slides under and interlocks with the retainer ring 130A in the female fitting connector 116A.

To enable the retainer tab 128A to slide under the retainer ring 130A, in some embodiments, the retainer ring 130A may formed from spring metal, such as spring steel. Additionally, as in the depicted example, to facilitate sliding the retainer tab 128A under the retainer ring 130A, the leading inner edge of the ring protrusion 134 on the retainer ring 130 may have a female taper (e.g., conical inner surface) while the leading outer edge of the retainer tab 128 has a male taper (e.g., conical outer surface). Furthermore, to facilitate interlocking the retainer ring 130A with the retainer tab 128A, the retainer ring 130A may be biased radially inward such that the retainer ring 130A tries to make its inner surface diameter smaller than the outer surface diameter of the retainer tab 128A. Moreover, to facilitate properly aligning the male fitting connector 118A with the female fitting connector 116A and, thus, corresponding connector bores 120, the leading inner edge of the base portion 119A of the female fitting connector 116A may have a female taper (e.g., conical inner surface) that narrows toward its connector bore 120A.

However, it should be appreciated that the depicted example is merely intended to be illustrative and not limiting. In particular, in other embodiments, the leading inner edge of the base portion 119A in the female fitting connector 116A may not include a female taper. Additionally or alternatively, in other embodiments, the leading inner edge of the ring protrusion 134 on the retainer ring 130A may not include a female taper (e.g., when the leading outer edge of the retainer tab 128 has a male taper) or the leading outer edge of the retainer tab 128 on the male fitting connector 118A may not include a male taper (e.g., when the leading inner edge of the ring protrusion 134 has a female taper). Furthermore, as will be described in more detail below, in other embodiments, a female fitting connector 116 may define a connector cavity 124 using a retainer ring 130 secured around its base portion 119, for example, instead of defining the connector cavity 124 using the base portion 119 itself.

In any case, in the depicted example, to facilitate securing the retainer ring 130A in the connector cavity 124A, the base portion 119A of the female fitting connector 116A defines a ledge 136, which extends part way into the connector cavity 124A, and the retainer ring 130 includes a ring lip 138, which is implemented (e.g., sized and/or shaped) to interlock with the ledge 136. In particular, the axial length of the connector cavity 124A may be longer than the axial length of the retainer ring 130A, thereby enabling the retainer ring 130A to slide axially within the connector cavity 124 such that the ring lip 138 interlocks with the ledge 136. Additionally, in the depicted example, to facilitate maintaining the ring lip 138 on the retainer ring 130A interlocked with the ledge 136, a spacer ring 140 may be disposed within the connector cavity 124A after the retainer ring 130A.

However, it should again be appreciated that the depicted example is merely intended to be illustrative and not limiting. In particular, in other embodiments, the female fitting connector 116A may not include a spacer ring 140. Additionally or alternatively, in other embodiments, the retainer ring 130A may not include a ring lip 138 and the base portion 119A of the female fitting connector 116A may not define a ledge 136.

In any case, as in the depicted example, to facilitate sealing corresponding connector bores 120 from external environmental conditions, in some embodiments, a quick connect fitting connector pair 114 may include one or more fitting seals 50—namely one or more connector seals 142. In particular, as in the depicted example, a connector seal 142 in a quick connect fitting connector pair 114 may be compressed between opposing side surfaces of the female fitting connector 116 and the male fitting connector 118 in the quick connect fitting connector pair 114. In other words, in such embodiments, the connector seal 142 may be compressed between and, thus, facilitate blocking fluid flow between the opposing side surfaces of the female fitting connector 116 and the male fitting connector 118 when the male fitting connector 118 is secured to the female fitting connector 116.

In some embodiments, a connector seal 142 in a quick connect fitting connector pair 114 may be part of a male fitting connector 118 in the quick connect fitting connector pair 114. Additionally or alternatively, a connector seal 142 in a quick connect fitting connector pair 114 may be part of a female fitting connector 116 in the quick connect fitting connector pair 114. Furthermore, in some embodiments, one or more connector seals 142 in a quick connect fitting connector pair 114 may be made using metal, such as carbon steel, stainless steel, duplex stainless steel, super duplex stainless steel, or any combination thereof. Additionally or alternatively, one or more connector seals 142 in a quick connect fitting connector pair 114 may be made using non-metallic material, such as a polymer, rubber, and/or plastic.

However, it should again be appreciated that the depicted example is merely intended to be illustrative and not limiting. In particular, in other embodiments, the quick connect fitting connector pair 114A may include multiple discrete connector seals 142, for example, to facilitate improving sealing integrity. Alternatively, in other embodiments, the quick connect fitting connector pair 114A may not include a discrete connector seal 142, for example, when engagement between opposing side surfaces of its female fitting connector 116A and its male fitting connector 118A is sufficient to seal corresponding connector bores 120 from external environmental conditions. Moreover, as mentioned above, in other embodiments, a female fitting connector 116 in a quick connect fitting connector pair 114 may define a connector cavity 124 using a (e.g., external) retainer ring 130 secured around its base portion 119, for example, instead of defining the connector cavity 124 using the base portion 119 itself.

Figure 9:
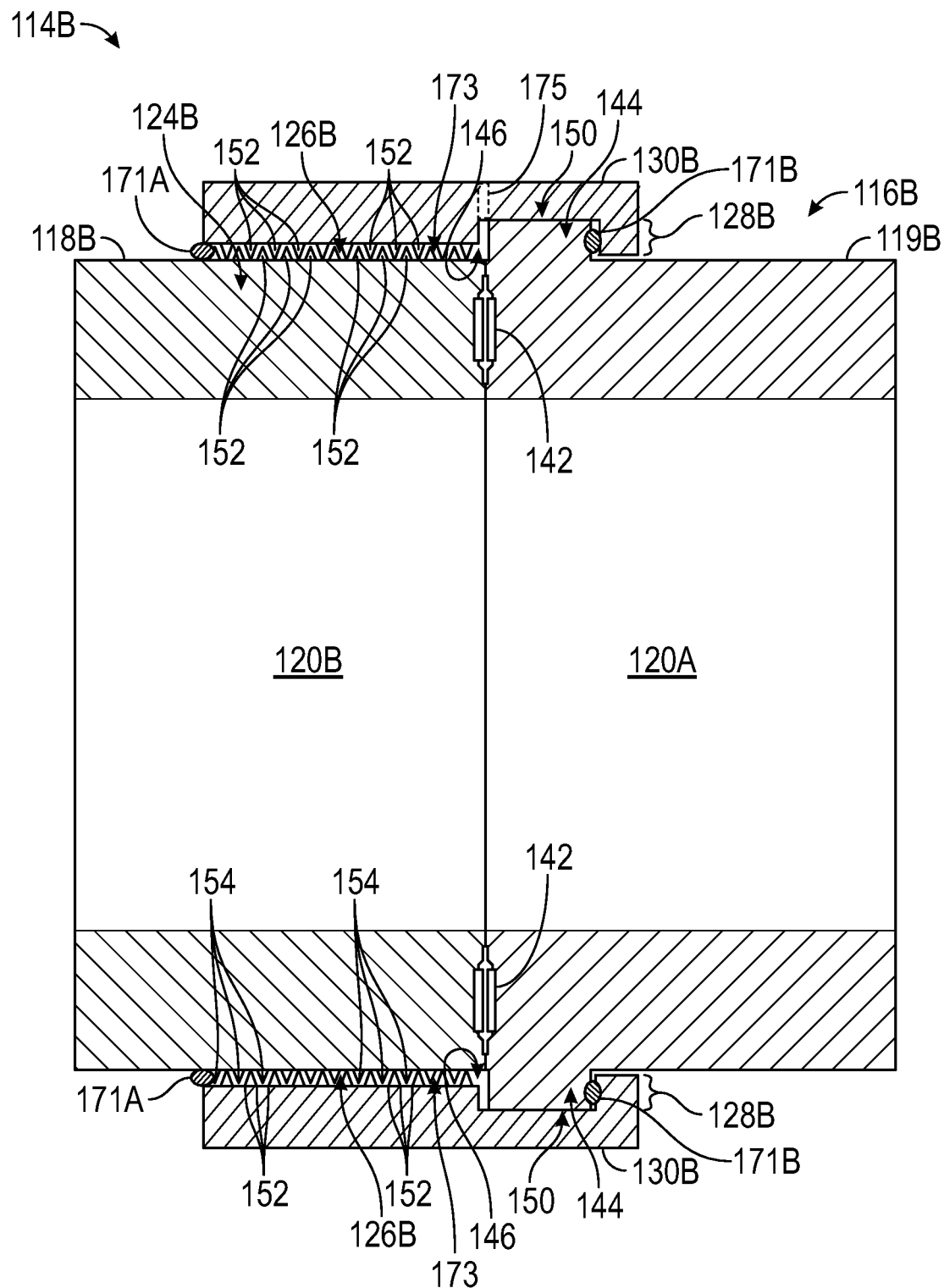
FIG. 9 is an axial cross-section profile of another example of a pair of fitting connectors, in accordance with an embodiment of the present disclosure.

To help illustrate, another example of a quick connect fitting connector pair 114B is shown in FIG. 9. As in the quick connect fitting connector pair 114A of FIG. 8, the quick connect fitting connector pair 114B of FIG. 9 includes a female fitting connector 116B and a male fitting connector 118B. As described above, in some embodiments, a fitting connector 44 (e.g., female fitting connector 116 or male fitting connector 118) of a pipe fitting 18 may be a discrete component and, thus, bolted and/or welded to the fitting body 46 of the pipe fitting 18.

However, as described above, in other embodiments, a fitting connector 44 (e.g., female fitting connector 116 or male fitting connector 118) of a pipe fitting 18 may be integrated with the fitting body 46 of the pipe fitting 18. In other words, in such embodiments, the female fitting connector 116B may be a fitting connector section of the fitting body 46 in a pipe fitting 18. Additionally or alternatively, the male fitting connector 118B may be fitting connector section of the fitting body 46 in another pipe fitting 18.

Although primarily described using pipe fittings examples, it should be appreciated that the techniques described in the present disclosure are not limited to pipe fittings 18. In particular, as described above, fitting connectors 44 may be used to connect a pipe fitting 18 to another pipeline component, such as a bore fluid source 12 or a bore fluid destination 14. Thus, it should be appreciated the techniques described in the present disclosure can also be applied to fitting connectors 44 in other types of pipeline components, such as a bore fluid source 12 or a bore fluid destination 14.

In any case, similar to FIG. 8, the female fitting connector 116B of FIG. 9 includes a base portion 119B, which defines a (e.g., first) connector (e.g., fitting) bore 120A, while the male fitting connector 118B defines another (e.g., second) connector bore 120B. However, as depicted in FIG. 9, the female fitting connector 116B additionally includes a (e.g., external) retainer ring 130B, which is rotatably secured around its base portion 119B to define its connector cavity 124B. To facilitate rotatably securing the retainer ring 130B to the base portion 119B, the retainer ring 130B may include a ring cavity 144, which is defined circumferentially along a trailing (e.g., following) side of its inner surface 146, while the outer surface 150 of the leading end of the base portion 119B may include a retainer tab (e.g., protrusion) 128B, which extends radially outward such that the retainer tab 128B can be slidably disposed within the ring cavity 144. In fact, since it includes a retainer tab 128B, in some embodiments, the base portion 119B of the female fitting connector 116B in FIG. 9 may be used as the male fitting connector 118A in FIG. 8.

In any case, to facilitate securing the male fitting connector 118B in the connector cavity 124B, the retainer ring 130B includes ring threading 152 on a leading side of its inner surface 146 while the outer surface 126B of the leading end of the male fitting connector 118B includes base threading 154. In particular, the ring threading 152 and the base threading 154 may be implemented (e.g., sized and/or shaped) to threadingly interlock. Thus, in such embodiments, the male fitting connector 118B may be secured to the female fitting connector 116B by inserting the leading end of the male fitting connector 118B under the retainer ring 130B and rotating the retainer ring 130B relative to the male fitting connector 118B.

Nevertheless, similar to FIG. 8, to facilitate sealing its connector bores 120 from external environmental conditions, the quick connect fitting connector pair 114B includes a connector seal 142. In particular, the connector seal 142 may be compressed between opposing side surfaces of the female fitting connector 116B and the male fitting connector 118B. In other words, the connector seal 142 may be compressed between and, thus, facilitate blocking fluid flow between the opposing side surfaces of the female fitting connector 116 and the male fitting connector 118 when the male fitting connector 118 is secured to the female fitting connector 116.

As described above, in some embodiments, a connector seal 142 in a quick connect fitting connector pair 114 may be part of a male fitting connector 118 in the quick connect fitting connector pair 114. Additionally or alternatively, a connector seal 142 in a quick connect fitting connector pair 114 may be part of a female fitting connector 116 in the quick connect fitting connector pair 114. Furthermore, in some embodiments, one or more connector seals 142 in a quick connect fitting connector pair 114 may be made using metal, such as carbon steel, stainless steel, duplex stainless steel, super duplex stainless steel, or any combination thereof. Additionally or alternatively, one or more connector seals 142 in a quick connect fitting connector pair 114 may be made using non-metallic material, such as a polymer, rubber, and/or plastic.

However, it should be appreciated that the depicted example is merely intended to be illustrative and not limiting. In particular, in other embodiments, the quick connect fitting connector pair 114B may include multiple discrete connector seals 142, for example, to facilitate improving sealing integrity.

To facilitate testing sealing integrity provided by a connector seal 142, as in the depicted example, in some embodiments, a quick connect fitting connector pair 114 may additionally include test seals 171 and a test port 175, which opens through its retainer ring 130 to enable the connector seal 142 to be pressure tested. In particular, in the depicted example, a first test seal 171A is compressed between the leading end of the retainer ring 130B and the male fitting connector 118B while a second test seal 171B is compressed between the trailing end of the retainer ring 130B and the base portion 119B of the female fitting connector 116B and, thus, facilitate sealing a region 173 defined between the inner surface 146 of the retainer ring 130B, the outer surface 126B of the male fitting connector 118B, and the outer surface 150 of the base portion 119B of the female fitting connector 116B from external environmental conditions. Since the connector seal 142 is intended to sealing the connector bores 120 in the quick connect fitting connector pair 114B from external conditions and, thus, the region 173 defined between the retainer ring 130B, the male fitting connector 118B, and the base portion 119B of the female fitting connector 116, sealing integrity provided by the connector seal 142 may be tested at least in part by supplying (e.g., injecting) test fluid to the region 173 and determining whether fluid pressure within the region 173 nevertheless unexpectedly drops, which would be indicative of test fluid potentially leaking past the connector seal 142 into the connector bores 120.

However, it should again be appreciated that the depicted example is merely intended to be illustrative and not limiting. In particular, in other embodiments, the quick connect fitting connector pair 114B may not include a discrete connector seal 142, for example, when engagement between opposing side surfaces of its female fitting connector 116B and its male fitting connector 118B is sufficient to seal corresponding connector bores 120 from external environmental conditions. In any case, in this manner, a quick connect fitting connector pair 114 may be implemented and/or assembled to enable pipeline components, such as pipe fittings 18, to be secured to one another without using discrete threaded fasteners, such as bolts or a screws, or hot tooling, such as welding or brazing, which, at least in some instances, may facilitate decreasing the time it takes to secure the pipeline components to one another and, thus, improving pipeline deployment efficiency.

Figure 10:
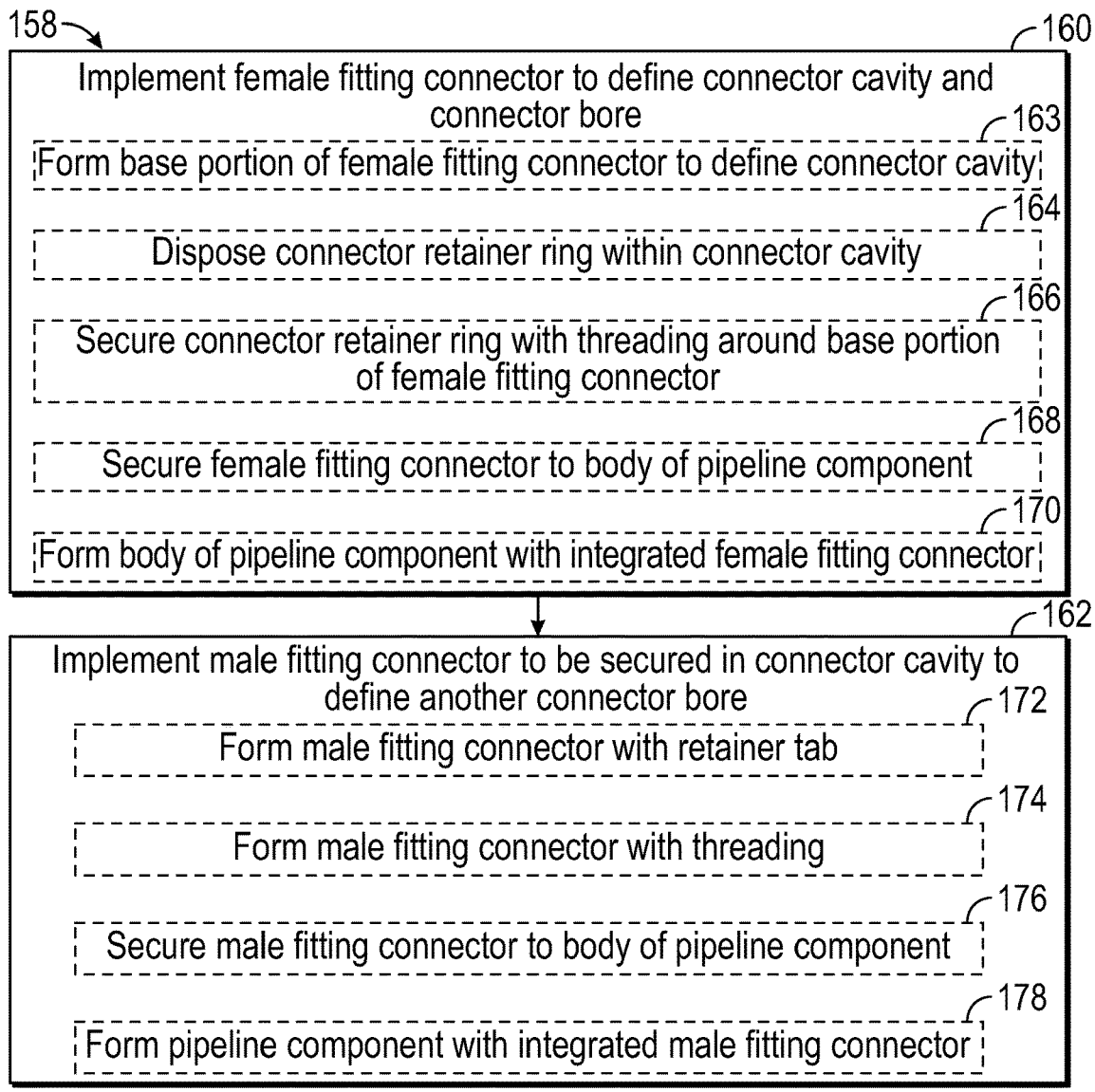
FIG. 10 is a flow diagram of an example of a process for implementing (e.g., manufacturing) a pair of fitting connectors to be deployed in a pipeline system, in accordance with an embodiment of the present disclosure.

To help further illustrate, an example of a process 158 for implementing (e.g., manufacturing) a quick connect fitting connector pair 114 is described in FIG. 10. Generally, the process 158 includes implementing a female fitting connector to define a connector cavity and a connector bore (process block 160). Additionally, the process 158 generally includes implementing a male fitting connector to be secured within the connector cavity to define another connector bore (process block 162).

Although specific process blocks are described in a specific order, which corresponds with an embodiment of the present disclosure, it should be appreciated that the example process 158 is merely intended to be illustrative and non-limiting. In particular, in other embodiments, a process 158 for implementing a quick connect fitting connector pair 114 may include one or more additional blocks and/or omit one or more of the depicted blocks. Moreover, in other embodiments, one or more of the depicted blocks may be performed in a different order, for example, such that the male fitting connector is implemented before the female fitting connector.

In any case, as described above, a quick connect fitting connector pair 114 generally includes a female fitting connector 116, which is implemented (e.g., formed, cast, forged, milled, forged, and/or molded) to define a connector cavity 124 and a connector bore 120. Thus, implementing a quick connect fitting connector pair 114 may generally include implementing (e.g., forming, casting, forming, milling, forging, and/or molding) a female fitting connector 116 to define a connector cavity 124 (process block 160). In some embodiments, a female fitting connector 116 may be formed at least in part using metal, such as carbon steel, stainless steel, duplex stainless steel, super duplex stainless steel, or any combination thereof.

Additionally, as described above, in some embodiments, a base portion 119 of a female fitting connector 116 may be formed (e.g., implemented, cast, milled, forged, and/or molded) to define its connector cavity 124. In other words, in such embodiments, implementing a female fitting connector 116 may include forming (e.g., implementing, casting, milling, forging, and/or molding) its base portion 119 to define its connector cavity 124 (process block 163). To facilitate insertion into the connector cavity 124, in some such embodiments, the base portion 119 of the female fitting connector 116 may also be formed with a female taper on its leading inner edge.

Furthermore, as described above, when its connector cavity 124 is defined by its base portion 119, a female fitting connector 116 may additionally include a (e.g., internal) retainer ring 130 disposed within the connector cavity 124. In other words, in such embodiments, implementing a female fitting connector 116 may include disposing a (e.g., internal) retainer ring 130 within its connector cavity 124 (process block 164). In particular, in some such embodiments, the retainer ring 130 may include a ring protrusion 134 (e.g., with a female taper) on a leading edge on its inner surface 132. Additionally, to facilitate securing the retainer ring 130 within the connector cavity 124, in some embodiments, a spacer ring 140 may be disposed within the connector cavity 124 after the retainer ring 130 to facilitate maintaining a ring lip 138 on the retainer ring 130 interlocked with a ledge 136, which extends part way into the connector cavity 124.

However, as described above, in other embodiments, a connector cavity 124 in a female fitting connector 116 may not be defined by its base portion 119. Instead, in some such embodiments, the connector cavity 124 may be defined by a (e.g., external) retainer ring 130, which has ring threading 152 on a leading side of its inner surface 146, secured to the base portion 119 of the female fitting connector 116. In other words, in such embodiments, implementing a female fitting connector 116 may include securing a (e.g., external) retainer ring 130, which has ring threading 152 on a leading side of its inner surface 146, around the base portion 119 of the female fitting connector 116 (process block 166). In particular, to enable the retainer ring 130 to rotate relative to the base portion 119 of the female fitting connector 116, in some such embodiments, the retainer ring 130 may include a ring cavity 144 on a trailing (e.g., following) side of its inner surface 146 while the outer surface 150 of a leading end of the base portion 119 has a retainer tab 128, which extends radially outward and is implemented (e.g., sized and/or shaped) to be disposed within the ring cavity 144.

In any case, as described above, in some embodiments, a female fitting connector 116 may be a discrete component and, thus, secured to the body, such as a fitting body 46, of a pipeline component, such as a pipe fitting 18. Accordingly, in such embodiments, implementing a female fitting connector 116 may include securing the female fitting connector 116 to the body of a pipeline component (process block 168). For example, a discrete female fitting connector 116 may be secured to the fitting body 46 of a pipe fitting 18 via threaded fasteners 68, such as bolts or screws. Additionally or alternatively, a discrete female fitting connector 116 may be welded or brazed to the fitting body 46 of a pipe fitting 18.

However, as described above, in other embodiments, a female fitting connector 116 may not be a discrete component. Instead, in some such embodiments, the female fitting connector 116 may be integrated with the body, such as a fitting body 46, of a pipeline component, such as a pipe fitting 18. In other words, in such embodiments, implementing a female fitting connector 116 may include forming the body of a pipeline component to include an integrated female fitting connector 116 and, thus, a fitting connector section (process block 170).

In any case, in addition to a female fitting connector 116, as described above, a quick connector fitting connector pair 114 generally includes a male fitting connector 118, which is implemented (e.g., formed, cast, forged, milled, and/or molded) to be secured in the connector cavity 124 of the female fitting connector 116 and to define a connector bore 120. Thus, implementing a quick connect fitting connector pair 114 may generally include implementing (e.g., forming, casting, forming, milling, forging, and/or molding) a male fitting connector 118, which is to be secured in the connector cavity 124 of a corresponding female fitting connector 116, to define a connector bore 120 (process block 162). In some embodiments, a male fitting connector 118 may be formed at least in part using metal, such as carbon steel, stainless steel, duplex stainless steel, super duplex stainless steel, or any combination thereof.

To facilitate securing a male fitting connector 118 in the connector cavity 124 of a female fitting connector 116, as described above, in some embodiments, the outer surface 126 of a leading end of the male fitting connector 118 may include a retainer tab 128, which is formed (e.g., implemented, milled, cast, forged, and/or molded) to extend radially outward such that the retainer tab 128 can slide under and interlock with a retainer ring 130 disposed within the connector cavity 124. In other words, in such embodiments, implementing a male fitting connector 118 may include forming (e.g., implementing, casting, forging, milling, and/or molding) a leading end of the male fitting connector 118 to include a retainer tab 128 that extends radially outward (process block 172). To facilitate sliding the retainer tab 128 under the retainer ring 130, in some such embodiments, a leading outer edge of the retainer tab 128 may be formed to include a male taper (e.g., conical outer surface).

However, as described above, to facilitate securing a male fitting connector 118 in the connector cavity 124 of a female fitting connector 116, in other embodiments, the outer surface 126 of a leading end of the male fitting connector 118 may include base threading 154, which is formed (e.g., implemented, milled, cast, forged, and/or molded) to threadingly interlock with ring threading 152 on the inner surface 146 of a retainer ring 130 that is secured around a base portion 119 of the female fitting connector 116. In other words, in such embodiments, implementing a male fitting connector 118 may include forming (e.g., implementing, casting, forging, milling, and/or molding) the outer surface 126 of a leading end of the male fitting connector 118 to include base threading 154 (process block 174).

In any case, as described above, in some embodiments, a male fitting connector 118 may be a discrete component and, thus, secured to the body, such as a fitting body 46, of a pipeline component, such as a pipe fitting 18. Accordingly, in such embodiments, implementing a male fitting connector 118 may include securing the male fitting connector 118 to the body of a pipeline component (process block 176). For example, a discrete male fitting connector 118 may be secured to the fitting body 46 of a pipe fitting 18 via threaded fasteners 68, such as bolts or screws. Additionally or alternatively, a discrete male fitting connector 118 may be welded or brazed to the fitting body 46 of a pipe fitting 18.

However, as described above, in other embodiments, a male fitting connector 118 may not be a discrete component. Instead, in some such embodiments, the male fitting connector 118 may be integrated with the body, such as a fitting body 46, of a pipeline component, such as a pipe fitting 18. In other words, in such embodiments, implementing a male fitting connector 118 may include forming the body of a pipeline component to include an integrated male fitting connector 118 and, thus, a fitting connector section (process block 178). In this manner, a quick connect fitting connector pair 114 may be implemented to enable corresponding pipeline components, such as pipe fittings 18, to be secured to one another without using discrete threaded fasteners, such as bolts or a screws, or hot tooling, such as welding or brazing, which, at least in some instances, may facilitate decreasing the time it takes to secure the pipeline components to one another and, thus, improving pipeline deployment efficiency.

Figure 11:
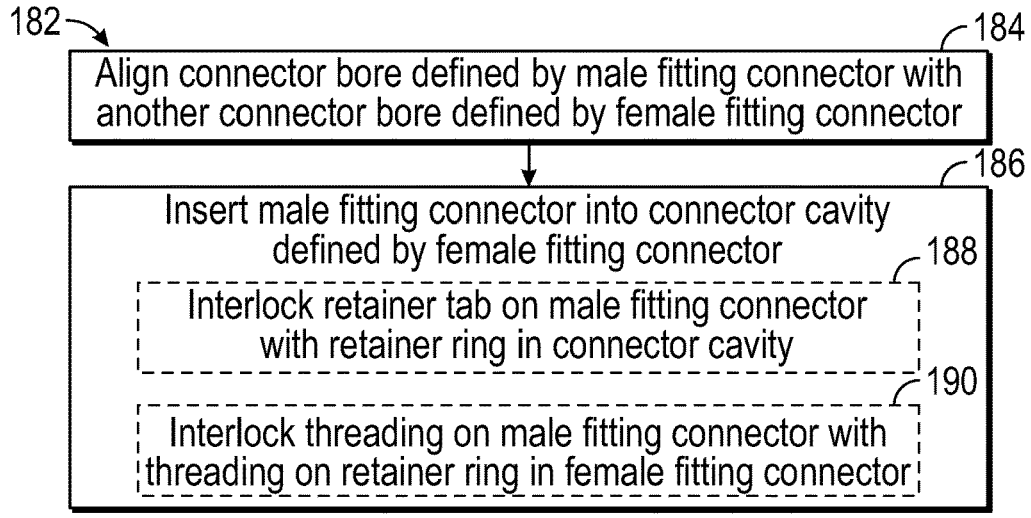
FIG. 11 is a flow diagram of an example of a process for assembling (e.g., deploying) a pair of fitting connectors in a pipeline system, in accordance with an embodiment of the present disclosure.

To help further illustrate, an example of a process 182 for assembling (e.g., deploying) a quick connect fitting connector pair 114 to fluidly connect corresponding pipeline components is described in FIG. 11. Generally, the process 182 includes aligning a connector bore defined by a male fitting connector with another connector bore defined by a female fitting connector (process block 184). Additionally, the process 182 generally includes inserting the male fitting connector into a connector cavity defined by the female fitting connector (process block 186)

Although specific process blocks are described in a specific order, which corresponds with an embodiment of the present disclosure, it should be appreciated that the example process 182 is merely intended to be illustrative and non-limiting. In particular, in other embodiments, a process 182 for assembling a quick connect fitting connector pair 114 to fluidly connect corresponding pipeline components may include one or more additional blocks and/or omit one or more of the depicted blocks.

In any case, as described above, a quick connect fitting connector pair 114 generally includes a female fitting connector 116 and a male fitting connector 118, which each defines a corresponding connector bore 120. In particular, to facilitate fluidly connecting corresponding pipeline components, the connector bores 120 defined by the female fitting connector 116 and the male fitting connector 118 may be fluidly connected once assembled in a pipeline system 10. As such, assembling a quick connect fitting connector pair 114 may generally include aligning a connector bore 120 defined by its male fitting connector 118 with another connector bore 120 defined by its female fitting connector 116 (process block 184). To facilitate properly aligning the connector bores 120, in some embodiments, a leading inner edge of the female fitting connector 116 may have a female taper that tapers radially inward toward the connector bore 120 of the female fitting connector 116.

Once the connector bores 120 are aligned, to facilitate securing the male fitting connector 118 to the female fitting connector 116 and, thus, fluid connecting corresponding pipeline components, the male fitting connector 118 may be inserted into the connector cavity 124 defined by the female fitting connector 116 such that the retainer ring 130 of the female fitting connector engages (e.g., interlock with) the outer surface 126 of the male fitting connector 118 (process block 186). In particular, as described above, in some embodiments, the connector cavity 124 may be defined by a base portion 119 of the female fitting connector 116 and the female fitting connector 116 may include a (e.g., internal) retainer ring 130 disposed within the connector cavity 124. Additionally, in such embodiments, the outer surface 126 of a leading end of the male fitting connector 118 may include a retainer tab 128, which extends radially outward and is implemented (e.g., sized and/or shaped) to slide under and interlock with the retainer ring 130. Thus, in such embodiments, the male fitting connector 118 may be secured to the female fitting connector 116 simply by stabbing the male fitting connector 118 into the connector cavity 124 of the female fitting connector 116 such that the retainer tab 128 on the male fitting connector 118 slides under and interlocks with the retainer ring 130 of the female fitting connector 116, for example, with the assistance of special-purpose (e.g., hydraulic) deployment equipment (process block 188).

However, as described above, in other embodiments, the connector cavity 124 in a female fitting connector 116 may be defined by a (e.g., external) retainer ring 130 secured around the base portion 119 of the female fitting connector 116, for example, instead of defining the connector cavity 124 using the base portion 119 itself. In particular, in such embodiments, a leading side of the inner surface 146 of the retainer ring 130 may include ring threading 152 while the outer surface 126 of a leading end of the male fitting connector 118 may include base threading 154, which is implemented (e.g., sized and/or shaped) to threadingly engage the ring threading 152. Thus, in such embodiments, the male fitting connector 118 may be secured to the female fitting connector 116 by inserting the male fitting connector 118 under the retainer ring 130 and rotating the retainer ring 130 relative to the male fitting connector 118 such that the ring threading 152 on the retainer ring 130 threading interlocks (e.g., engages) with the base threading 154 on the male fitting connector 118 (process block 190). In this manner, a quick connect fitting connector pair 114 may be implemented and/or assembled to enable pipeline components, such as pipe fittings 18, to be secured to one another without using discrete threaded fasteners, such as bolts or a screws, or hot tooling, such as welding or brazing, which, at least in some instances, may facilitate decreasing the time it takes to secure the pipeline components to one another and, thus, improving pipeline deployment efficiency.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system, comprising:
  a first pipeline component configured to be fluidly connected to a pipe segment that comprises tubing that defines a pipe bore and a fluid conduit within an annulus of the tubing, wherein:
    the first pipeline component comprises a male fitting connector that defines a second connector bore; and
    an outer surface of a leading connector end of the male fitting connector comprises a retainer tab; and
  a second pipeline component comprising a female fitting connector that defines a connector cavity, wherein the female fitting connector comprises:
    a base portion that defines a first connector bore, the connector cavity, and a ledge that extends part way into the connector cavity;
    a retainer ring that interlocks with the retainer tab on the outer surface of the leading connector end of the male fitting connector to facilitate securing the male fitting connector to the female fitting connector without using a discrete threaded fastener or hot tooling, wherein the retainer ring is disposed within the connector cavity and comprises:
      a ring protrusion on an inner surface of a leading ring end of the retainer ring; and
      a ring lip; and
    a spacer ring disposed in the connector cavity to facilitate securing the retainer ring in the connector cavity at least in part by maintaining the ring lip on the retainer ring interlocked with the ledge.

2. The pipeline system of claim 1, wherein:
  the first pipeline component comprises a bore fluid source, a bore fluid destination, or a first pipe fitting; and
  the second pipeline component comprises the bore fluid source, the bore fluid destination, or a second pipe fitting.

3. The pipeline system of claim 1, wherein the retainer tab on the outer surface of the leading connector end of the male fitting connector slides under and interlocks with the ring protrusion on the retainer ring of the female fitting connector to facilitate securing the male fitting connector to the female fitting connector.

4. The pipeline system of claim 3, wherein:
  a leading inner edge of the retainer ring in the female fitting connector comprises a female taper; and
  a leading outer edge of the retainer tab on the male fitting connector comprises a male taper.

5. The pipeline system of claim 1, wherein the female fitting connector or the male fitting connector comprises a connector seal compressed between opposing side surfaces of the female fitting connector and the male fitting connector to facilitate sealing the second connector bore of the male fitting connector and the first connector bore of the female fitting connector from external environmental conditions.

6. A method of assembling a pipeline system, comprising:
  aligning a first connector bore defined by a female fitting connector in a first pipeline component with a second connector bore defined by a male fitting connector in a second pipeline component, wherein the female fitting connector comprises:
    a base portion that defines the first connector bore, a connector cavity, and a ledge that extends part way into the connector cavity;
    a retainer ring disposed within the connector cavity of the female fitting connector, wherein the retainer ring comprises a ring protrusion on an inner surface of a leading ring end of the retainer ring and a ring lip; and
    a spacer ring disposed in the connector cavity of the female fitting connector to facilitate securing the retainer ring in the connector cavity at least in part by maintaining the ring lip on the retainer ring interlocked with the ledge; and
  securing the male fitting connector to the female fitting connector at least in part by:
    inserting a leading connector end of the male fitting connector into the connector cavity defined in the female fitting connector; and
    engaging the retainer ring of the female fitting connector with an outer surface of the male fitting connector to facilitate fluidly connecting the first pipeline component and the second pipeline component via the first connector bore of the female fitting connector and the second connector bore of the male fitting connector without using a discrete threaded fastener or hot tooling.

7. The method of claim 6, wherein:
  the outer surface of the leading connector end of the male fitting connector comprises a retainer tab that extends radially outward; and
  securing the male fitting connector to the female fitting connector comprises inserting the male fitting connector into the female fitting connector until the retainer tab on the male fitting connector slides under and interlocks with the ring protrusion on the retainer ring of the female fitting connector.

8. The method of claim 7, wherein:
a leading inner edge of the retainer ring in the female fitting connector comprises a female taper to facilitate sliding the retainer tab on the male fitting connector under the retainer ring;
a leading outer edge of the retainer tab on the male fitting connector comprises a male taper to facilitate sliding the retainer tab under the retainer ring in the female fitting connector; or
both.

9. The method of claim 7, wherein securing the male fitting connector to the female fitting connector comprises compressing a connector seal between opposing side surfaces of the male fitting connector and the female fitting connector to facilitate sealing the first connector bore of the female fitting connector and the second connector bore of the male fitting connector from external environmental conditions.

10. A system, comprising:
a female fitting connector that defines a connector cavity, wherein:
the female fitting connector is configured to be secured to or integrated with a first body of a first pipeline component; and
the female fitting connector comprises:
a retainer ring disposed within the connector cavity, wherein the retainer ring comprises a ring lip;
a base portion that defines a first connector bore, the connector cavity, and a ledge that extends part way into the connector cavity; and
a spacer ring disposed in the connector cavity to facilitate securing the retainer ring in the connector cavity at least in part by maintaining the ring lip on the retainer ring interlocked with the ledge; and
a male fitting connector that defines a second connector bore, wherein:
the male fitting connector is configured to be secured to or integrated with a second body of a second pipeline component; and
the male fitting connector is configured to be disposed within the connector cavity of the female fitting connector such that the retainer ring in the female fitting connector interlocks with an outer surface of the male fitting connector to facilitate fluidly connecting the first pipeline component and the second pipeline component via the first connector bore of the female fitting connector and the second connector bore of the male fitting connector.

11. The system of claim 10, wherein:
the retainer ring of the female fitting connector comprises a ring protrusion on an inner surface of a leading ring end of the retainer ring; and
the outer surface of a leading connector end of the male fitting connector comprises a retainer tab that is configured to slide under and interlock with the retainer ring in the female fitting connector to facilitate securing the male fitting connector to the female fitting connector.

12. The system of claim 10, wherein the male fitting connector is configured to be secured to the female fitting connector without using a threaded fastener or hot tooling.

* * * * *